(12) United States Patent
Kim et al.

(10) Patent No.: US 11,476,468 B2
(45) Date of Patent: Oct. 18, 2022

(54) ELECTRODE, ELECTRODE ASSEMBLY AND METHOD FOR MANUFACTURING THE SAME

(71) Applicant: LG Chem, Ltd., Seoul (KR)

(72) Inventors: Il Hong Kim, Daejeon (KR); Joon Kwon, Daejeon (KR); Gi Su Jeong, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/488,485

(22) PCT Filed: Nov. 8, 2018

(86) PCT No.: PCT/KR2018/013557
§ 371 (c)(1),
(2) Date: Aug. 23, 2019

(87) PCT Pub. No.: WO2019/103365
PCT Pub. Date: May 31, 2019

(65) Prior Publication Data
US 2020/0251743 A1   Aug. 6, 2020

(30) Foreign Application Priority Data

Nov. 22, 2017   (KR) .................. 10-2017-0156193

(51) Int. Cl.
*H01M 4/66* (2006.01)
*H01M 4/04* (2006.01)
(Continued)

(52) U.S. Cl.
CPC ......... *H01M 4/667* (2013.01); *H01M 4/0404* (2013.01); *H01M 10/052* (2013.01); *H01M 50/46* (2021.01)

(58) Field of Classification Search
CPC .. H01M 4/667; H01M 4/0404; H01M 10/052; H01M 2/1673
See application file for complete search history.

(56) References Cited

U.S. PATENT DOCUMENTS

2006/0127773 A1*  6/2006  Kawakami ............ H01M 4/622
                                                    429/245
2011/0039140 A1   2/2011  Miyahisa et al.
(Continued)

FOREIGN PATENT DOCUMENTS

| CN | 102208603 A | 10/2011 |
| CN | 106960976 A | 7/2017 |

(Continued)

OTHER PUBLICATIONS

Extended European Search Report including Written Opinion for Application No. EP18881655.7 dated May 29, 2020, 8 pages.
(Continued)

*Primary Examiner* — Osei K Amponsah
(74) *Attorney, Agent, or Firm* — Lerner, David, Littenberg, Krumholz & Mentlik, LLP

(57) ABSTRACT

The present invention provides an electrode assembly, in which a plurality of electrodes are laminated, and a separator is inserted between adjacent electrodes. The outermost electrode disposed at an outermost layer of the electrode assembly includes a slurry applied to one surface of a current collector, and a protection layer adhered to the other surface of the current collector. Further, the outermost electrode is laminated to allow the slurry to contact the separator.
Furthermore, a method for manufacturing the electrode assembly comprises applying a slurry to one surface of a current collector and laminating a protection layer on the other surface of the current collector to form an outermost electrode; allowing the outermost electrode to pass between a pair of press-rollers to perform a rolling process; and
(Continued)

laminating the rolled outermost electrode to be disposed on an uppermost layer or a lowermost layer of the electrode assembly.

6 Claims, 4 Drawing Sheets

(51) Int. Cl.
*H01M 10/052* (2010.01)
*H01M 50/46* (2021.01)

(56) References Cited

U.S. PATENT DOCUMENTS

| | | |
|---|---|---|
| 2012/0225345 A1 | 9/2012 | Kim |
| 2014/0134472 A1 | 5/2014 | Kim |
| 2015/0056744 A1 | 2/2015 | Song et al. |
| 2015/0072204 A1* | 3/2015 | Kwon ............... H01M 10/0436 429/94 |
| 2015/0364629 A1 | 12/2015 | Song et al. |
| 2015/0364630 A1 | 12/2015 | Song et al. |
| 2015/0364638 A1 | 12/2015 | Song et al. |
| 2016/0372780 A1 | 12/2016 | Sohn et al. |
| 2019/0334157 A1* | 10/2019 | Seok ................... H01M 50/581 |

FOREIGN PATENT DOCUMENTS

| | | | |
|---|---|---|---|
| CN | 107134561 A | | 9/2017 |
| EP | 3070776 A1 | | 9/2016 |
| JP | H11329408 A | | 11/1999 |
| KR | 10-2010-0112643 A | | 10/2010 |
| KR | 10-2011-0112241 A | | 10/2011 |
| KR | 10-2012-0000891 A | | 1/2012 |
| KR | 10-2016-0025990 A | | 3/2016 |
| KR | 10-2016-0034183 A | | 3/2016 |
| KR | 10-20160025990 A * | 3/2016 | .............. H01M 4/04 |
| KR | 10-2016-0040020 A | | 4/2016 |
| KR | 10-2016-0141864 A | | 12/2016 |
| KR | 10-2017-0022697 A | | 3/2017 |
| KR | 10-2017-0053488 A | | 5/2017 |
| KR | 10-20170053488 A * | 5/2017 | .............. H01M 4/04 |

OTHER PUBLICATIONS

Search Report dated Nov. 28, 2021 from Office Action for Chinese Application No. 201880012757 dated Dec. 3, 2021. 3 pgs.
Search Report dated May 5, 2022 from the Office Action for Chinese Application No. 201880012757.9 dated May 11, 2022, 2 pages. [See p. 1, categorizing the cited reference].

* cited by examiner

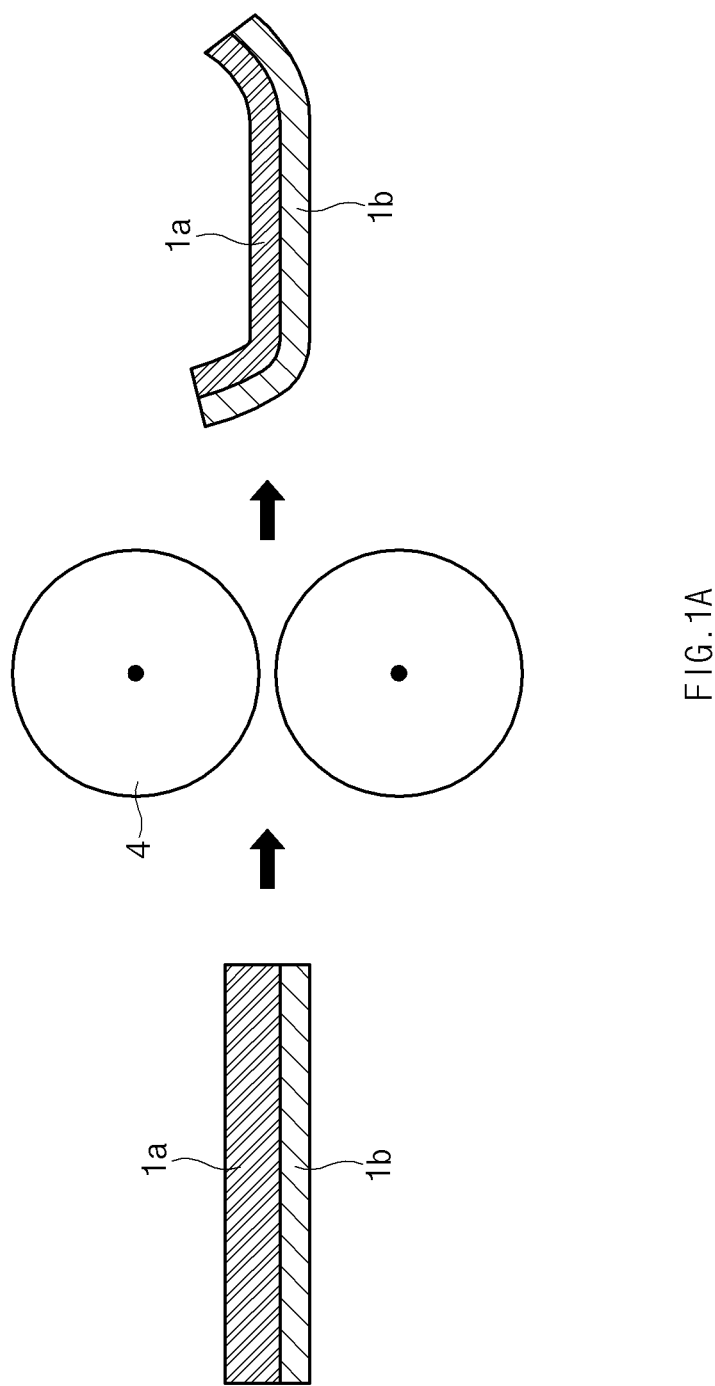

ELECTRODE, ELECTRODE ASSEMBLY AND METHOD FOR MANUFACTURING THE SAME

CROSS-REFERENCES TO RELATED APPLICATIONS

This application is a U.S. national phase application, pursuant to 35 U.S.C. § 371, of PCT/KR2018/013557, filed Nov. 8, 2018, designating the United States, which claims priority to Korean Application No. 10-2017-0156193, filed Nov. 22, 2017. The entire contents of the aforementioned patent applications are incorporated herein by this reference.

TECHNICAL FIELD

The present invention relates an electrode, an electrode assembly manufactured by laminating the electrode and a method for manufacturing the same, and more particularly, to an electrode which is capable of preventing warpage from occurring due to rolling when manufactured and capable of reducing possibility of occurrence of short circuit when an external impact occurs (particularly, when penetration damage of the pouch occurs), an electrode assembly and a method for manufacturing the same.

BACKGROUND ART

Batteries that store electrical energy may be generally classified into primary batteries and secondary batteries. A primary battery is a disposable consumable battery. On the other hand, a secondary battery is a chargeable battery that is manufactured using a material in which oxidation and reduction processes between current and the material are capable of being repeated. In other words, when the reduction reaction to the material is performed by the current, the battery is charged. When the oxidation reaction to the material is performed by the current, the battery is discharged. Such charging-discharging cycles are repeatedly performed to generate electricity.

In general, secondary batteries include nickel-cadmium batteries, nickel-hydrogen batteries, lithium ion batteries, and lithium ion polymer batteries. Such secondary batteries are applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

The lithium secondary battery is generally formed by laminating a positive electrode (i.e., cathode), a separator, and a negative electrode (i.e., anode). Further, materials of the positive electrode, the separator, and the negative electrode are selected in consideration of battery lifespan, charging/discharging capacities, temperature characteristics, stability, and the like. The charging and discharging of the lithium secondary battery are performed while lithium ions are intercalated and deintercalated from lithium metal oxide of the positive electrode to the negative electrode.

In general, unit cells, each of which has a three-layered structure of a positive electrode/a separator/a negative electrode or a five-layered structure of a positive electrode/a separator/a negative electrode/a separator/a positive electrode or a negative electrode/a separator/a positive electrode/a separator/a negative electrode, are assembled to constitute one electrode assembly. In addition, the electrode assembly is accommodated in a case such as a cylindrical can and a prismatic pouch.

The electrode is manufactured by applying slurry to both surfaces or one surface of a current collector. A process of manufacturing electrode includes a step of putting and stirring (mixing) source materials of the slurry, a step of applying the completed slurry to a collector, a step of rolling the current collector coated with the slurry, a step of forming an electrode tab, and a step of performing vacuum drying.

The rolling process is performed to reduce a thickness of the electrode, to increase a density, and to improve a binding strength between the current collector 1a and the slurry. In general, as illustrated in FIG. 1A, the rolling process is performed in a manner in which the electrode passes between two press-rollers 4.

In the electrode, the slurry 1b and 2b may be generally applied to both surfaces of the current collectors 1a and 2a. However, in the case of the electrode that is placed on the outermost layer, since lithium ions are not exchanged at the outermost layer, a single-sided electrode on which the slurry 1b is applied to only one surface of the current collector 1a may be provided.

However, since deformation rates of the collector 1a and the slurry 1b are different from each other (since thermal expansion coefficients, densities, and the like are different from each other) while heat and pressure are applied via the press-roller 4, the single-sided electrode may bend as illustrated in FIG. 1A.

Further, in the case of the outermost electrode, the collector 1a made of a metal material may be closest within the pouch. Thus, when the electrode is pierced by a pointed object, or when a nail 5 penetrates through the pouch during a stability test, short circuit may occur as illustrated in FIG. 1B.

DISCLOSURE OF THE INVENTION

Technical Problem

Accordingly, to solve the above problem, a main object of the present invention is to provide an electrode, an electrode assembly, and a method for manufacturing the same.

Technical Solution

To achieve the above object, the present invention provides an electrode in which a plurality of electrodes are laminated, and a separator is inserted between adjacent electrodes. The electrode includes a slurry applied to one surface of a current collector, and a protection layer adhered to the other surface. The protection layer is made of a polymer material having a molecular weight equal to or greater than 10,000. According to the present invention, the electrodes may be negative electrodes or positive electrodes.

The present invention also provides an electrode assembly, in which a plurality of electrodes are laminated, and a separator is inserted between adjacent electrodes. An outermost electrode disposed at an outermost layer of the electrode assembly includes a slurry applied to one surface of a current collector, and a protection layer adhered to the other surface of the current collector. The outermost electrode is laminated to allow the slurry to contact the separator.

Further, the polymer material may have electrical insulation, and when rolling is performed in a state in which the slurry, the current collector, and the protection layer are laminated, the protection layer may be deformed in a direction in which deformation of the slurry (and the collector) is offset.

According to an embodiment of the present invention, the outermost electrode may be the electrode placed at an uppermost layer of the electrode assembly, and the protection layer may be laminated to be disposed at the uppermost layer of the electrode assembly. Alternatively, the outermost electrode may be the electrode disposed at a lowermost layer of the electrode assembly, and the protection layer may be laminated to be disposed at the lowermost layer of the electrode assembly.

Furthermore, the present invention provides a method for manufacturing an electrode assembly, in which a plurality of electrodes are laminated, and a separator is inserted between adjacent electrodes. The method includes a step of applying a slurry to one surface of a current collector and laminating a protection layer on the other surface of the current collector to form an outermost electrode; a step of allowing the outermost electrode to pass between a pair of press-rollers to perform a rolling process; and a step of laminating the rolled outermost electrode to be disposed on an uppermost layer or a lowermost layer of the electrode assembly.

When the outermost electrode is disposed at the uppermost layer of the electrode assembly, the protection layer may be laminated to be disposed at the uppermost layer, and when the outermost electrode is disposed at the lowermost layer of the electrode assembly, the protection layer may be laminated to be disposed at the lowermost layer.

Advantageous Effects

According to the present invention having the above-described structure, the protection layer may be laminated on the outermost electrode to suppress or offset the bending or warping force during the rolling. In addition, since the protection layer faces the inner surface of the pouch in the electrode assembly to protect the current collector, the electrode and the electrode assembly may be protected against the external impact.

BRIEF DESCRIPTION OF THE DRAWINGS

FIG. 1A is a view illustrating states before and after a single-sided electrode passes through a press-roller according to a related art.

MODE FOR CARRYING OUT THE INVENTION

Figure 1B:
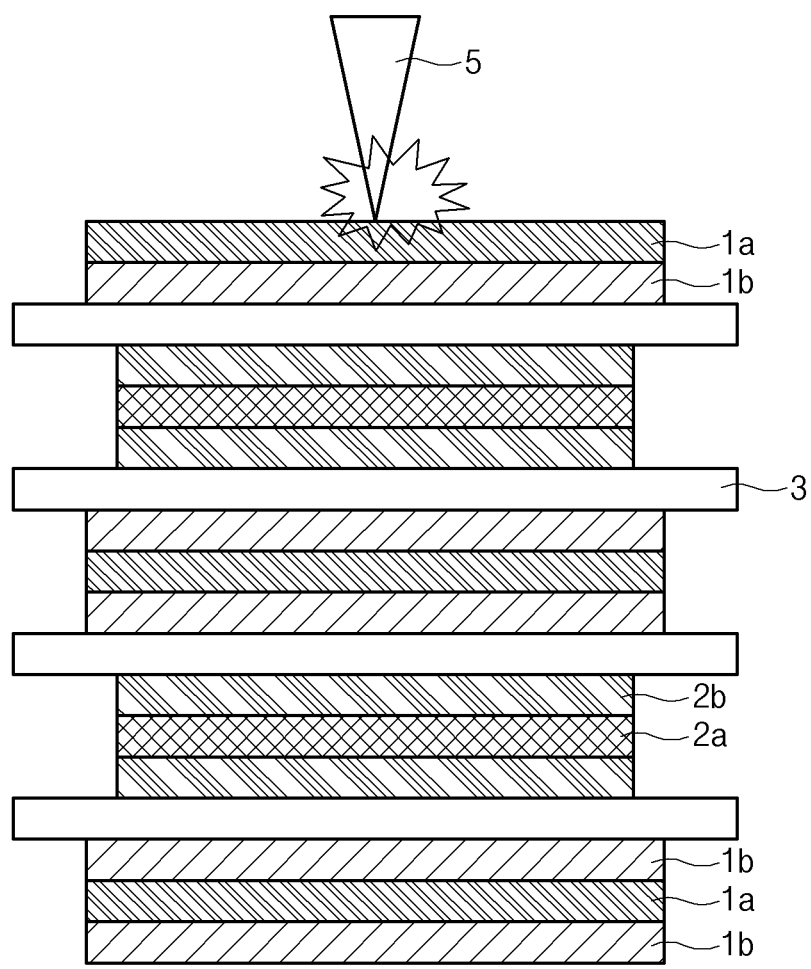
FIG. 1B is a view illustrating a state in which a nail penetrates to cause a short circuit when the single-sided electrode is laminated on the outermost layer of an electrode assembly according to the related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

In addition, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to an electrode assembly and a method for manufacturing the same. The electrode assembly has a structure in which a plurality of electrodes are laminated with a separator 3 disposed therebetween. In the electrode, which is disposed at the outermost layer, i.e., the uppermost layer or the lowermost layer, of the electrodes constituting the electrode assembly, a current collector 1*a* includes one surface coated with a slurry 1*b* and the other surface to which a protection layer 10 adheres, and the protection layer 10 is made of a polymer material having a molecular weight equal to or greater than 10,000. According to the present invention, the electrodes may be any of negative electrodes or positive electrodes.

Embodiment 1

Figure 2:
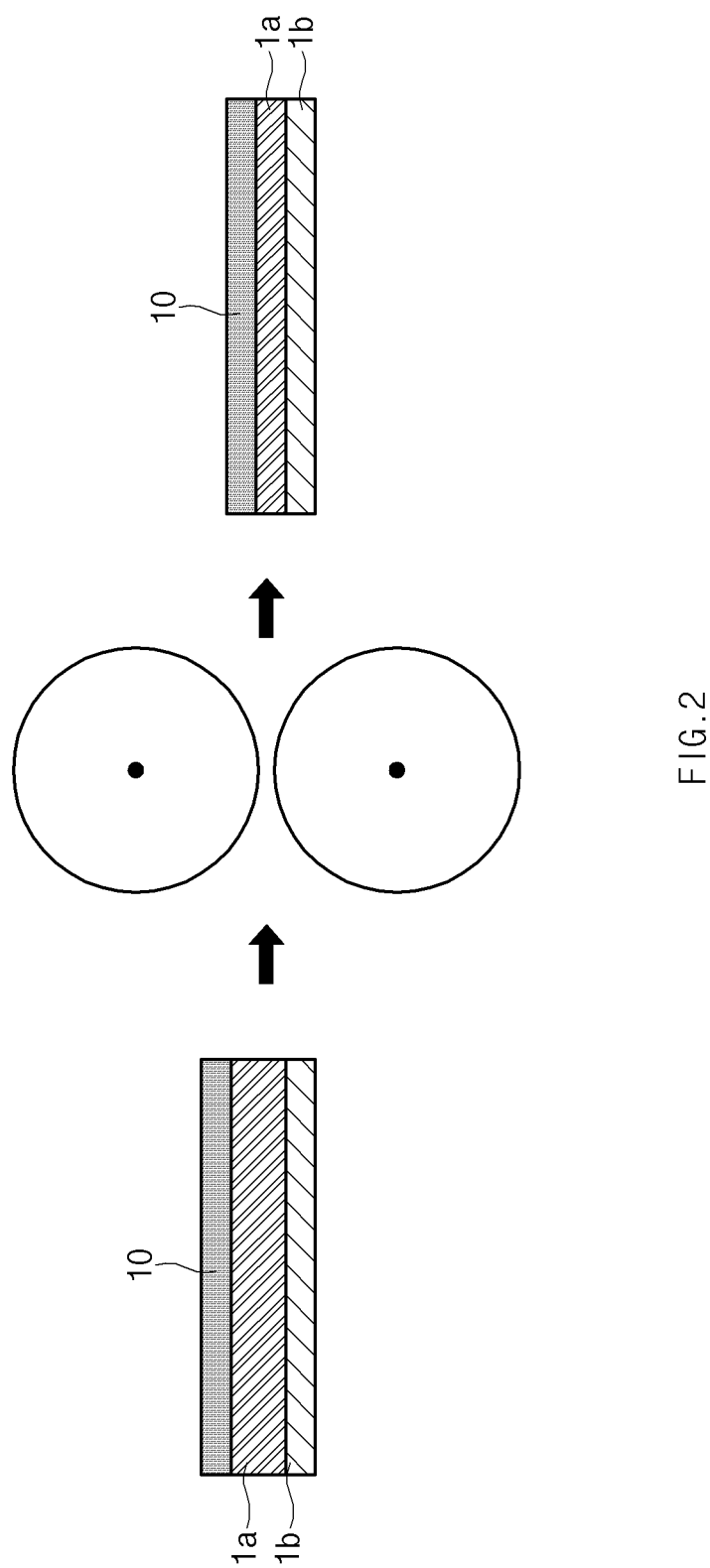
FIG. 2 is a view illustrating states before and after a single-sided electrode passes through a press-roller according to the present invention.
Figure 3:
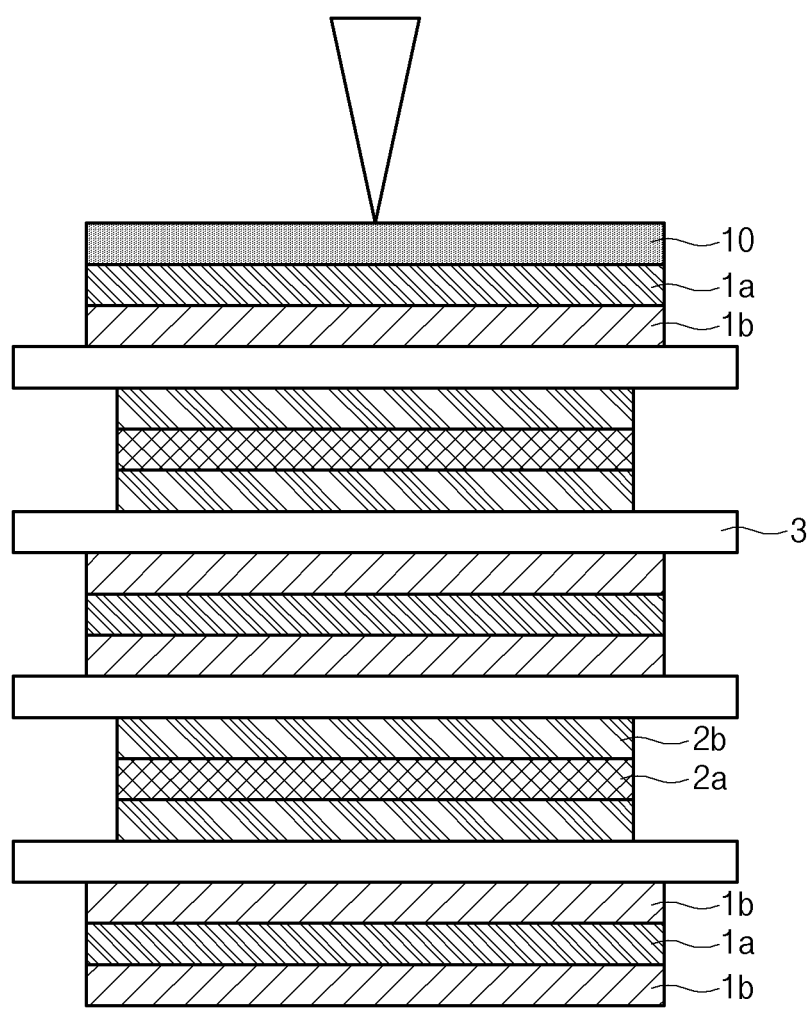
FIG. 3 is a view illustrating a state in which an occurrence of a short circuit is suppressed by a protection layer even though a nail penetrates when the single-sided electrode is laminated on the outermost layer of an electrode assembly according to the present invention.

As illustrated in FIGS. 2 and 3, an electrode assembly according to the present invention includes a structure in which a separator 3 is disposed between electrodes having polarities different from each other, and the electrodes and the separator 3 are repeatedly laminated (i.e., in FIG. 3, when the lowermost electrode is a negative electrode in which a negative electrode slurry 1*b* is applied to a negative electrode current collector 1*a*, the separator 3 is laminated on the negative electrode. Further, a positive electrode, in which a positive electrode slurry 2*b* is applied to a positive electrode current collector 2*a*, is laminated on the separator 3). The outermost electrode disposed at the outermost layer is provided with a protection layer 10. For reference, although the electrode in which the protection layer 10 is provided at only the uppermost layer is illustrated in FIG. 3, the protection layer 10 may be provided at the lowermost layer. Further, the electrode provided with the protection layer 10 may be the negative electrode or the positive electrode.

The slurry 1*b* is laminated to the outermost electrode on a side that contacts the separator 3, and the protection layer 10 is disposed at the uppermost layer (or the lowermost layer) of the electrode assembly.

The protection layer 10 is made of a polymer material having a molecular weight equal to or greater than 10,000. Further, the protection layer 10 is made of a material having electrical insulation to prevent a short circuit from occurring when a pointed object such as a nail 5 penetrates through a pouch (not shown).

Furthermore, when rolling is performed in a state in which the slurry 1*b*, the current collector 1*a*, and the protection layer 10 are laminated, as illustrated in FIG. 2, the protection layer 10 may be disposed at an opposite side of the current collector 1*a* to suppress deformation of the slurry 1*b* or be deformed to offset the deformation of the slurry 1*b* and/or the current collector 1*a* to allow the entire upper and lower layers to remain planar.

In this embodiment, the outermost electrode may be disposed at the uppermost layer or the lowermost layer in the electrode assembly. Accordingly, the protection layer 10 may be disposed at the uppermost or lowermost layer to be closest to the pouch in which the electrode assembly is accommodated (as illustrated in FIG. 3).

Embodiment 2

Furthermore, the present invention provides a method for manufacturing the above-described electrode assembly.

The method for manufacturing the electrode assembly according to the present invention includes a step of applying a slurry 1b to one surface of a current collector 1a and laminating a protection layer 10 on the other surface to manufacture the outermost electrode, a step of allowing the outermost electrode to pass between a pair of press-rollers 40 and thereby to roll the outermost electrode, and a step of laminating the rolled outermost electrode to be disposed at the uppermost or lowermost layer of the electrode assembly.

In particular, the slurry 1b is prepared by mixing a solution containing a binder in a solvent with an active material to have viscosity suitable for coating or applying. Further, in the press-roller 4, an appropriate pressure and heat may be applied to reduce a thickness of the electrode and to increase a density. Alternatively, before the outermost electrode is laminated in the electrode assembly, a process of cutting the electrode to an appropriate size, a process of processing an electrode tab, a process of performing vacuum drying to remove moisture contained in the electrode, and the like may be performed.

When the outermost electrode is disposed at the uppermost layer of the electrode assembly, the protection layer 10 is laminated to be disposed at the uppermost layer. When the outermost electrode is disposed at the lowermost layer of the electrode assembly, the protection layer 10 is laminated to be disposed at the lowermost layer.

According to the present invention having the above-described structure, the protection layer 10 may be laminated on the outermost electrode to suppress or offset the bending or warping force during the rolling. In addition, since the protection layer 10 faces the inner surface of the pouch in the electrode assembly to protect the current collector 1a, the electrode and the electrode assembly may be protected against the external impact.

While the embodiments of the present invention have been described with reference to the specific embodiments, it will be apparent to those skilled in the art that various changes and modifications may be made without departing from the spirit and scope of the invention as defined in the following claims.

The invention claimed is:

1. An electrode assembly, in which a plurality of electrodes are laminated with a separator interposed between adjacent electrodes, wherein an outermost electrode disposed at an outermost layer of the electrode assembly comprises:

a current collector;

a slurry applied on the current collector on one surface that faces the separator; and a protection layer adhered to the other surface of the current collector, wherein the protection layer is made of a polymer material having a molecular weight equal to or greater than 10,000, wherein, the electrode assembly is prepared by rolling the outermost electrode with a pair of press-rollers to form a rolled outermost electrode, wherein the protection layer is deformed to offset deformation of the slurry; and laminating the rolled outermost electrode on the outermost layer of the electrode assembly.

2. The electrode assembly of claim 1, wherein the polymer material has electrical insulation.

3. The electrode assembly of claim 1, wherein the outermost electrode is an electrode disposed at an uppermost layer of the electrode assembly, and wherein the protection layer is laminated to be disposed at the uppermost layer of the electrode assembly.

4. The electrode assembly of claim 1, wherein the outermost electrode is an electrode disposed at a lowermost layer of the electrode assembly, and wherein the protection layer is laminated to be disposed at the lowermost layer of the electrode assembly.

5. A method for manufacturing an electrode assembly, in which a plurality of electrodes are laminated with a separator interposed between adjacent electrodes, the method comprising:

applying a slurry to one surface of a current collector and laminating a protection layer on the other surface of the current collector to form an outermost electrode;

rolling the outermost electrode with a pair of press-rollers to form a rolled outermost electrode, wherein the protection layer is deformed to offset deformation of the slurry; and laminating the rolled outermost electrode to be disposed on an uppermost layer or a lowermost layer of the electrode assembly, wherein the protection layer is made of a polymer material having a molecular weight equal to or greater than 10,000, and wherein, when the rolling is performed, the protection layer is deformed to offset deformation of the slurry.

6. The method of claim 5, wherein, when the outermost electrode is disposed at the uppermost layer of the electrode assembly, the protection layer is disposed at the uppermost layer, and wherein, when the outermost electrode is disposed at the lowermost layer of the electrode assembly, the protection layer is disposed at the lowermost layer.

* * * * *